United States Patent [19]

Howe, Jr.

[11] 4,074,923

[45] Feb. 21, 1978

[54] LOCKING MECHANISM FOR SECURING A BEARING RING OR THE LIKE TO A SHAFT

[75] Inventor: Ralph S. Howe, Jr., New Britain, Conn.

[73] Assignee: Textron, Inc., Providence, R.I.

[21] Appl. No.: 752,835

[22] Filed: Dec. 20, 1976

[51] Int. Cl.² .............................................. F16C 35/06
[52] U.S. Cl. ........................................ 308/236; 403/7; 403/351; 403/362
[58] Field of Search .............. 403/350, 351, 374, 362, 403/320, 366, 367, 316, 7, DIG. 7; 308/236

[56] References Cited

U.S. PATENT DOCUMENTS

| 930,169 | 8/1909 | Exley | 403/350 X |
|---|---|---|---|
| 3,938,901 | 2/1976 | Howe, Jr. | 403/350 |

Primary Examiner—Andrew V. Kundrat
Attorney, Agent, or Firm—Hopgood, Calimafde, Kalil, Blaustein & Lieberman

[57] ABSTRACT

The invention contemplates a locking-ring configuration for use with a set-screw anchored collar, bearing ring or the like, to apply continuous load to the set-screw region (a) for enhanced set-screw clamping action upon a shaft and (b) for enhanced retention of set-screw adjustment. Various forms are described in the context of set-screw clamping of an anti-friction bearing via the inner ring thereof.

19 Claims, 11 Drawing Figures

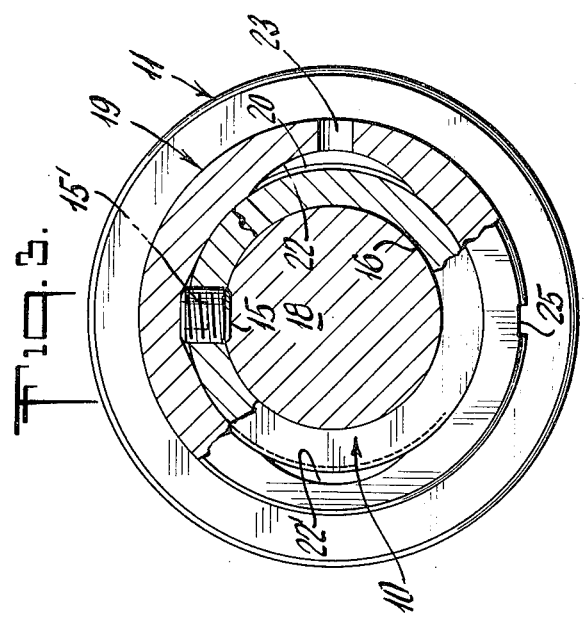
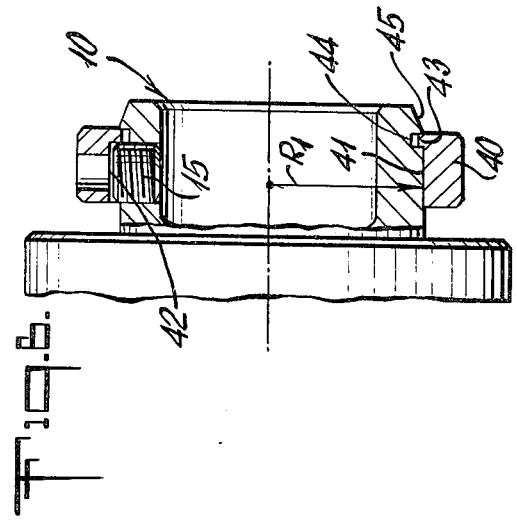
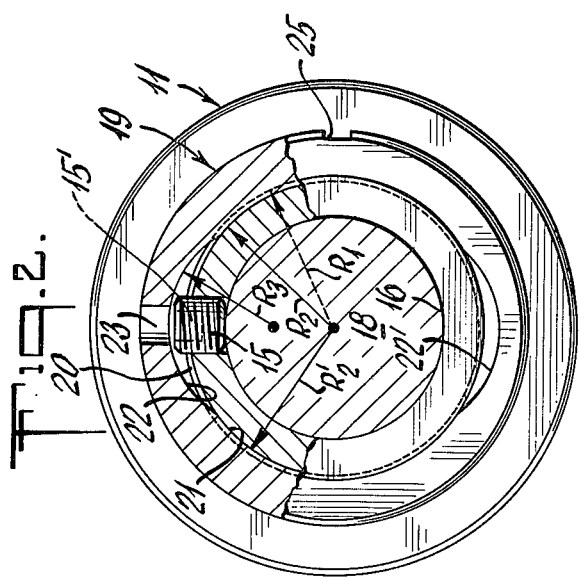
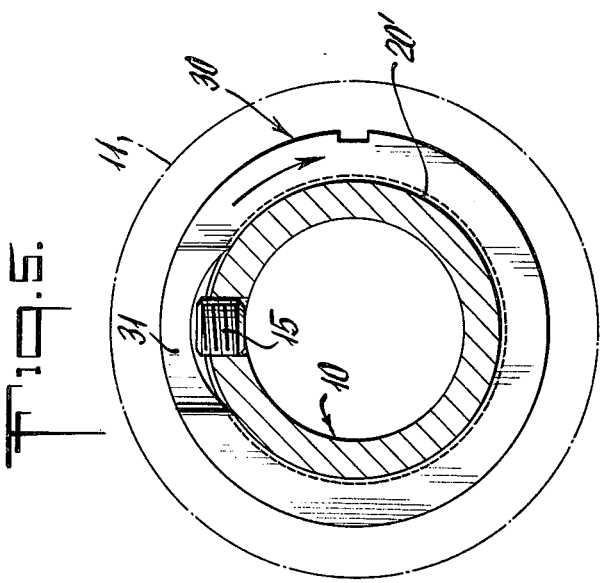
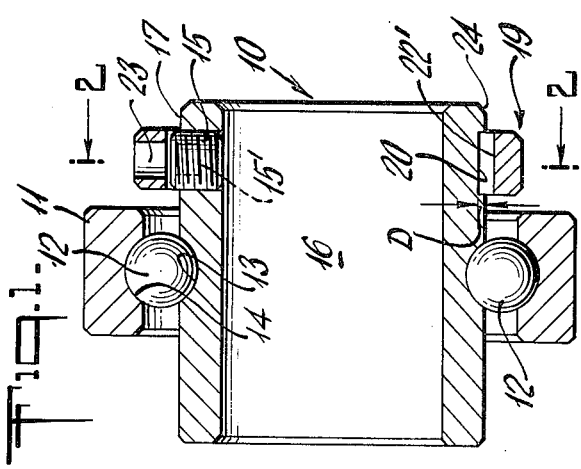
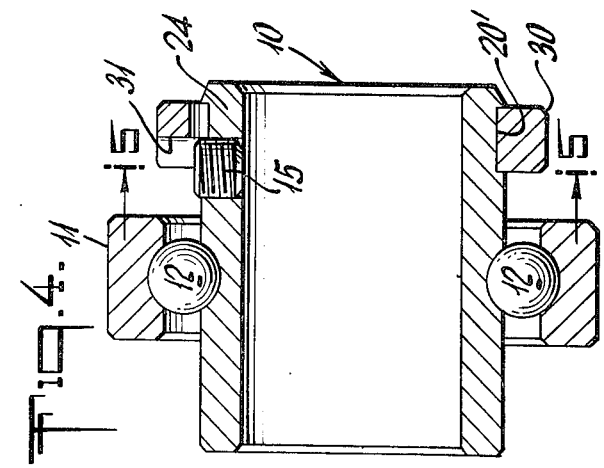

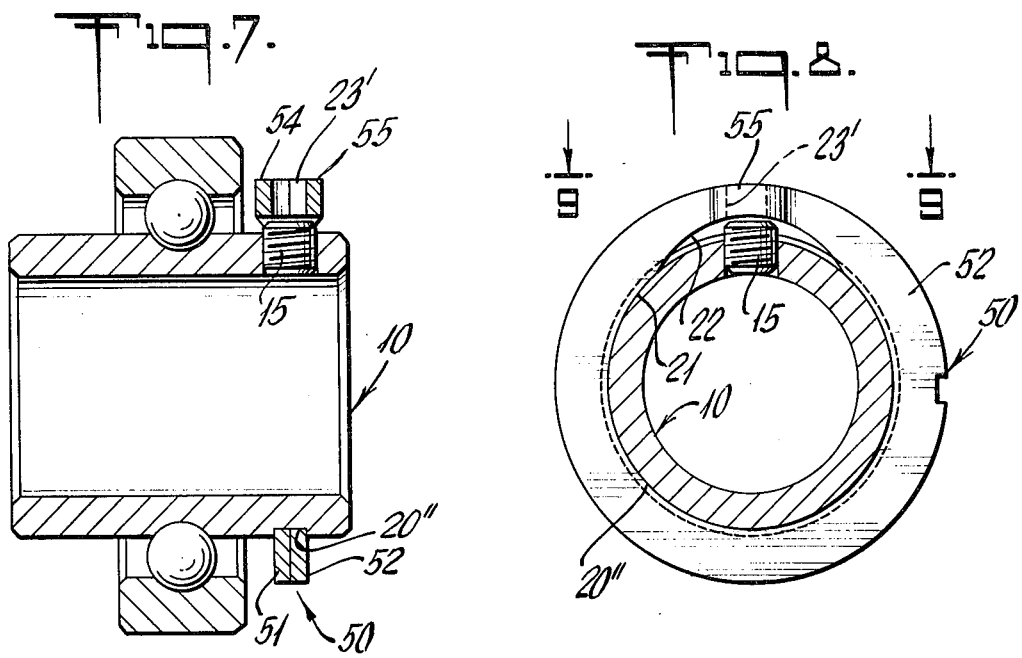
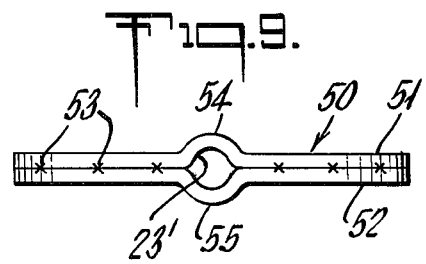
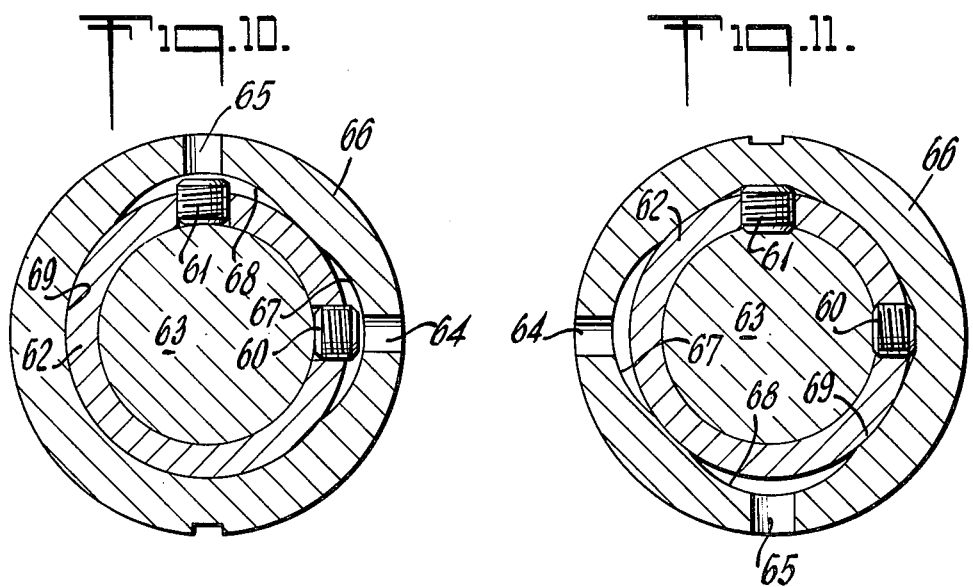

LOCKING MECHANISM FOR SECURING A BEARING RING OR THE LIKE TO A SHAFT

This invention relates to set-screw means for securing a collar or the like to a shaft and in particular for thus securing the inner ring of an antifriction bearing.

The securing of a collar, a bearing ring or the like to a shaft has been an age-old problem, and the use of one or more set screws represents a standard approach to the problem. However, when the thus-secured element is subjected to vibration or other motion under load, these techniques prove to be most inadequate. The set screw may be driven so tight as to locally break the surface of the shaft and then, in the presence of shear forces due to differential creep (e.g., due to bearing-ring bore circumference slightly greater than shaft circumference), the brokem region of the shaft surface is extended, and corrosion and vibration take their toll, often resulting in loss of the set-screw clamp action and of the set screw itself. Most often, the set screw merely unscrews under vibratory conditions, resulting in loss of locking contact with the shaft. Eccentric-locking collars, as of the kind disclosed in U.S. Pat. No. 2,718,415, represent an attempt to avoid the above difficulties; but such structures, while relatively simple, nevertheless require relatively complex machining and other sources of high manufacturing cost.

Accordingly, it is an object of the invention to provide an improved set-screw fastening mechanism.

Another object is to provide an improved ring-shaft locking device.

A specific object is to meet the foregoing objects with structure of elemental simplicity and low cost.

Another specific object is to meet the above objects with structure which will permanently retain the set screw against loss, and which will enhance the ability of the set screw to resist loss of its originally set clamped condition.

Another specific object is to provide a bearing construction, meeting the foregoing objects in regard to mounting the same to a shaft, and incorporating all mechanisms in a unit-handling single assembly.

Other objects and various further features of novelty and invention will be pointed out or will occur to those skilled in the art from a reading of the following specification, in conjunction with the accompanying drawings. In said drawings, which show preferred and illustrative forms of the invention:

FIG. 1 is a longitudinal sectional view of an antifriction bearing incorporating the shaft-securing feature of the invention;

FIG. 2 is a view in right-end elevation, with portions broken-away and shown in section, at the plane 2—2 of FIG. 1, and for a first relation of the parts;

FIG. 3 is a view similar to FIG. 2, for a second relation of the parts;

FIGS. 4 and 5 are views corresponding to FIGS. 1 and 2, respectively, to show a different embodiment of the invention, FIG. 5 being taken from the aspect 5—5 of FIG. 4;

FIG. 6 is a fragmentary view in longitudinal section, similar to FIG. 1, to show another embodiment;

FIGS. 7 and 8 are views corresponding to FIGS. 1 and 2, respectively, to show a further embodiment;

FIG. 9 is a fragmentary view of the locking ring of FIG. 8, as viewed from the plane 9—9 of FIG. 8; and FIGS. 10 and 11 are views corresponding to FIGS. 2 and 3, respectively, to show a still further embodiment.

In the embodiment of FIGS. 1, 2 and 3, the invention is shown in application to the inner ring 10 of an antifriction bearing which additionally comprises an outer ring 11 and plural antifriction elements 12 riding the radially opposed raceways 13–14 of rings 10–11. The ring 10 is of the so-called "wide-inner" variety, extending axially beyond the corresponding axial end of outer ring 11 for accommodation of a set screw 15 in a threaded radial bore; set screw 15 is shown to be of the so-called Allen-head variety, being socketed with hexagonal flats at 15' for removably inserted accommodation of a suitable wrench tool. The projecting (set-screw mounting) end of ring 10 is annular, being defined between a shaft-mounting bore 16 and an outer cylindrical surface 17, of radius $R_1$; of shaft 18 is seen in FIGS. 2 and 3, assembled to the bore 16.

A locking ring 19 circumferentially spans the inner ring 10 at the region of set screw 15 and is shown held axially captive in that relation, utilizing axial-retaining means coacting between rings 10–19. In the form shown, a shallow circumferential groove 20 is radially outwardly open and has a cylindrical bottom of radius $R_2$, and at a depth D from the outer surface 17; groove 20 is of width slightly in excess of the width of ring 19, and the substantial arcuate extent of the bore (21) of ring 19 is a cylinder, of radius $R_2$ slightly greater than the groove-bottom radius $R_2$, but sufficiently less than the outer-surface radius $R_1$, so that the side walls of the shallow groove 20 will retain ring 19 at all times.

In accordance with a feature of the invention, the set screw 15 is of axial length exceeding the radial extent of the threaded bore in which it is carried, so that when driven upon a shaft (18) the outer end of screw 15 projects beyond the groove bottom, being in fact shown projecting beyond the outer surface 17. In FIG. 2, this projecting end of screw 15 is seen to be received in a local recess 22 of the locking-ring bore; in register with recess 22 and set screw 15 in FIG. 2 is a tool-access opening 23, extending radially for easy Allen-wrench access to the socket 15' of screw 15. Preferably, the opening 23 is a drilled radial hole, of diameter accommodating tool rotation but less than the maximum diameter of set screw 15. The recess 22 has sloping sides, gently rising to the cylindrical bore surface 21; recess 22 may have milled flat opposed walls which are essentially tangent to surface 21 at intersection therewith, but it is simpler and adequate to form recess 22 as a cylindrical arc of radius $R_3$ (less than $R_1$ or $R_2$), and eccentric to the locking-ring axis, as shown by the eccentric-center dot for radius $R_3$ in FIG. 2.

To assemble locking ring 19 to the groove 20 of inner ring 10, it may be heated for sufficient expansion to slip over the end of ring 10, being allowed to contract into its described captive position, upon cooling. However, by use of one or more chamfers, as at the radially outer corner 24 of inner ring 10, or at the axial end of the cylindrical bore 21, or at both these locations, I have found it feasible to press-fit the parts 19-10 in their axially telescoped assembly, such assembly being completed by snap action as the press-fit interference is relieved, upon full axial locking-ring registration with groove 20.

FIG. 1 depicts the bearing and its locking ring 19 thus assembled into unit-handling relation, and with the tool-access opening 23 in angular registry with set screw 15. Upon assembly to a shaft 18, an inserted tool via 23 is used to set screw 15 tightly to the shaft, and upon tool removal, locking ring 19 is rotated about 90 degrees, to the locked position shown in FIG. 3. Such rotation is aided by use of a suitable spanner (not shown) engaging the access opening 23 and an angularly offset tool-engaging groove 25. In the course of such rotation, one of the sloping walls of recess 22 engages the projecting end of screw 15, causing development of strong radial compression upon screw 15, with accompanying elevated hoop tension in ring 19, and a small extent of compliant circumferential stretch in ring 19. Such stretch will be understood to reflect minor distortion of ring 19 into a somewhat elliptical configuration, upon take-up of radial clearance between $R_2$ and $R_2'$, and upon a chord-like local flattening at the region of recess 22. The locked position remains permanent, being retained by the noted hoop tension, and not only precluding any dislocation of the setting of screw 15, but also enhancing the radially driven set force of screw 15 upon shaft 18; at the same time, such hoop tension in ring 19 is also operative to establish a radial clamping action for the inner ring 10 against shaft 18, such action being at a contact zone 180° from set screw 15 and assuring additional shaft-to-ring locking. To unlock, the procedure is reversed, using the spanner tool to drive ring 19 back to its FIG. 2 position, where the Allen-head wrench may be inserted to back-off the set-screw 15, thus releasing all clamping to shaft 18.

The foregoing relationships and action will be better understood from an illustrative specific example, for the case of an inner ring 10 of 1.25-inch outer diameter and with a bore having a 0.004-inch clearance in its fit to a 1-inch diameter shaft. The depth D of groove 20 is illustratively 0.010-inch, and the cylindrical portion 21 of the locking ring bore has a 0.005-inch clearance to the bottom of groove 20. A $\frac{1}{4} \times 20$ set screw 15, 0.155-inch long, normally projects 0.025 to 0.015 beyond the groove bottom, in ample clearance with the recess 22 at the location of tool access 23, and yet a substantially cammed elevation is achieved at the locked (FIG. 3) relation of screw 15 to surface 21. The arcuate extent of recess 22 is about 75° about the ring axis, and the eccentric radius $R_3$ is 5/16 inch. Compliant circumferential stretch is enhanced by providing a second local recess 22' at a location diametrically opposed to recess 22. Finally, the locking ring 19 is suitably of 1045 steel, through-hardened to absorb the circumferential stretch and the acircular distortions noted above; such hardening will also be understood to provide resistance to undue scoring during ring-locking procedures.

FIGS. 4 and 5 illustrate a modification wherein a locking ring 30 is received and axially located in a shallow groove 20' which is axially offset into only partial axial overlap with the set screw 15. The tool-access opening is merely an axial recess 31 in an end face of the ring 30, being shown with an angular extent commensurate with the bore recess 22. Ring 30 is assembled via transient force-fit over an inner-ring chamfer 24, as previously explained. It will be understood that the inherent result of setting the lock by rotating ring 30 clockwise in the sense of FIG. 5 is to impart strong radially inward thread-advancing driving torque to set screw 15, in the course of setting to locked position.

FIG. 6 illustrates a modification wherein maximum threaded-bore length is available for set screw 15, in that the axial-locating formations are axially offset from the threaded region. Specifically, the locking ring 40 is provided with its cylindrical bore portion 41 of radius to coact directly with the outer radius $R_1$ of inner ring 10, the local-recess portion 42 being eccentric and radially outside this radius. Ring 40 includes a radially inward flange 43 freely received in an offset groove 44, upon completion of axial force-fit assembly over an end chamfer or cam 45 at the axial end of the inner bearing ring 10.

FIGS. 7, 8 and 9 illustrate a modification in which the locking ring 50 comprises two like stamped sheet-metal parts 51–52 in face-to-face assembly, retained as by spot or projection welds 53. The tool-access opening 23' is defined by registering oppositely bowed lobes 54–55 of these pressed-metal parts, and bore surfaces 21–22 and groove 20 may be as previously described.

FIGS. 10 and 11 illustrate that the invention is not limited to the use of a single set screw, two such screws 60–61 being shown at 90° spacing in the inner bearing ring 62. In the unclamped position of FIG. 10, assembly has been made to a shaft 63, and access openings 64–65 in a locking ring 66 enable the respective screws 60–61 to be driven tightly to shaft 63. Local recesses 67–68 also register with the spaced openings 64–65 and permit an assembled relationship that is otherwise similar to that of FIGS. 1 to 3. To set the lock, ring 66 is rotated approximately 180°, placing both set screws in firm compressional engagement with the cylindrical-bore portion 69 of ring 66, and with recesses 67–68 well offset from the respective set screws.

The described embodiments of the invention will be seen to have achieved all stated objects. A self-retaining unit-handling assembly is provided which assures permanent captive retention of the locking ring and set screw(s) alike, while also assuring against set-screw loosening and providing extra, enhanced locking force. And manufacturing cost is materially less than for alternative locking collar comstructioms of corresponding size.

While the invention has been described in detail for the preferred forms shown, it will be understood that modifications may be made without departure from the scope of the invention. For example, by suitably proportioning and locating the locking ring with respect to the corresponding axial end of the outer bearing ring 11, and in radial overlap therewith (as is the case for ring 19 in FIGS. 1 to 3), the locking ring (19) may provide a slinger function, being locked at a reasonably precise radial plane which may, if so desired, be located in close axial clearance and radial overlap with the adjacent axial end of outer ring 11.

What is claimed is:

1. A unit-handling collar and locking device for locking the collar to a shaft or the like, comprising an annular collar body having a shaft-mounting bore and a threaded radial bore, a set screw in the threaded bore, said set screw being of length exceeding the radial extent of the threaded bore; whereby when said screw is set to clamp said body in assembled relation to a shaft in the shaft-mounting bore, the outer end of said screw projects radially beyond the threaded bore; and a locking ring circumferentially spanning said body and set screw, axial-retaining means coacting between said ring and body for retaining said ring in at least some measure of overlap with said screw, said ring having a cylindrical bore portion sized for rotational support on the radially adjacent region of said body, said last-mentioned bore being locally recessed to radially clear said set screw at a location of angular registry therewith, said ring having a radial tool-access opening externally providing tool access to said set screw when said ring is in said angularly-registered location, and the local recess of the ring bore having a set-screw engageable cam surface for enabling said set screw to ride up to engagement with the cylindrical portion of the ring bore upon relative rotation of said ring and body.

2. The collar and locking device of claim 1, in which said local recess is cylindrically arcuate and of eccentric radius less than the cylindrical-bore radius of said ring, said eccentric radius being eccentrically offset from the cylindrical-bore axis of said ring at the angular region of the tool-access opening.

3. The collar and locking device of claim 1, wherein the periphery of said ring has a spanner-engaging formation angularly offset from the tool-access opening.

4. The collar and locking device of claim 2, wherein said local recess in one of a plurality of angularly spaced like eccentric recesses.

5. The collar and locking device of claim 2, wherein said local recess is one of two like eccentric recesses in diametrically opposed relation.

6. The collar and locking device of claim 1, wherein said axial-retaining means comprises a circumferentially continuous radially outwardly open groove in the outer surface of said body, the cylindrical bore of said ring having clearance for rotation in said groove and having axial-retaining radially overlapping interference with the adjacent walls of said groove.

7. The collar and locking device of claim 6, wherein the groove is near an axial end of said body and wherein the extent of said radially overlapping interference is relatively small, whereby said ring and body may be assembled in a transient circumferentially expanded compliant deformation of said ring.

8. The collar and locking device of claim 7, in which said body end is chamfered at its radially outer edge, for cammed compliant deformation of said ring in the course of ring assembly to said body.

9. The collar and locking device of claim 7, in which the cylindrical-bore portion of said ring is chamfered at one end, for cammed compliant deformative reaction with said body end in the course of ring assembly to said body.

10. The collar and locking device of claim 1, in which the tool-access opening is a radial bore of diameter less than the maximum diameter of said set screw.

11. The collar and locking device of claim 10, in which said set screw is of the socketed Allen-head variety.

12. The collar and locking device of claim 1, in which said set screw is one of two at angularly spaced threaded bores in said body, the cylindrical ring bore having a second local recess and said ring having a second tool-access opening at a location of angular offset from said first-mentioned tool-access opening, said angular offset corresponding to said angular spacing.

13. The collar and locking device of claim 1, in which the axial width of said ring is substantially the maximum diameter of said set screw.

14. The collar and locking device of claim 1, in which the axial width of said ring is less than the maximum diameter of said set screw, said tool-access opening being a local axial recess in one axial end of said ring.

15. The collar and locking device of claim 1, in which said ring comprises a circumferential body piece of stamped sheet metal, with said tool-access opening formed as a local axial offset in the otherwise smoothly continuous profile of said ring body.

16. The collar and locking device of claim 15, in which said ring-body piece is one of two like pieces, in welded face-to-face relation at angular registry of said axial offsets and with said offsets projecting away from each other to define the single tool-access opening therebetween.

17. The collar and locking device of claim 1, in which said axial-retaining means comprises a circumferentially continuous radially outwardly open groove in the outer surface of said body, said groove being of width less than the ring width, and said ring having a radially inward flange portion having an axially-retained running fit in said groove.

18. The collar and locking device of claim 1, in which said collar is the inner ring of an antifriction bearing having a raceway at a location of axial offset from said set screw.

19. An antifriction bearing, comprising inner and outer rings with opposed raceways, antifriction elements riding said raceways and spacing said rings, said inner ring being wider than said outer ring and projecting at one axial end beyond the corresponding axial end of said outer ring, the projecting end of said inner ring having a threaded radial bore and a set screw therein for securing said inner ring to a shaft, said set screw exceeding the radial extent of the threaded bore, a locking ring circumferentially spanning said inner-ring end and set screw, and axial-retaining means coacting between said locking ring and said inner ring for retaining said locking ring in axial overlap with at least a portion of said screw, said locking ring having a cylindrical bore portion sized for rotational support on the radially adjacent region of said inner ring, said last-mentioned bore being locally recessed to radially clear said set screw at a location of angular registry therewith, said locking ring having a radial tool-access opening externally providing tool access to said set screw when said locking ring is in said angularly-registered location, and the local recess of the locking-ring bore having a set-screw-engageable cam surface for enabling said set screw to ride up to engagement with the cylindrical portion of the locking-ring bore upon relative rotation of said inner and locking rings.

* * * * *